US 8,666,244 B2

(12) United States Patent
Bruno et al.

(10) Patent No.: US 8,666,244 B2
(45) Date of Patent: Mar. 4, 2014

(54) MONITORING OPTICAL PARAMETERS OF A MODULATED OPTICAL SIGNAL

(75) Inventors: Gianmarco Bruno, Genoa (IT); Fabio Cavaliere, Vecchiano (IT)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 47 days.

(21) Appl. No.: 13/375,763

(22) PCT Filed: Jun. 1, 2009

(86) PCT No.: PCT/EP2009/056701
§ 371 (c)(1),
(2), (4) Date: Jan. 24, 2012

(87) PCT Pub. No.: WO2010/139355
PCT Pub. Date: Dec. 9, 2010

(65) Prior Publication Data
US 2012/0114330 A1      May 10, 2012

(51) Int. Cl.
*H04B 10/08* (2011.01)
*H04B 17/00* (2006.01)

(52) U.S. Cl.
USPC ............................................................ 398/26

(58) Field of Classification Search
None
See application file for complete search history.

(56) References Cited

U.S. PATENT DOCUMENTS 6,681,081 B2 *   1/2004   Mao ............................... 398/147
7,149,407 B1    12/2006   Doerr et al.

OTHER PUBLICATIONS

Dlubek et al, Method for optical signal-to-noise ratio monitoring based on modulation spectrum assessment (Published in Optoelectronics, IET, vol. 3, Issue: 2, Apr. 2009).*
Lamia Baker-Meflah et al., "In-Band OSNR Monitoring Using Spectral Analysis After Frequency Down-Conversion", Jan. 15, 2007, pp. 115-117, IEEE Photonics Technology Letters, vol. 19, No. 2.
M.P. Dlubek et al., "Method for Optical Signal-to-Noise Ratio Monitoring Based on Modulation Spectrum Assessment", Apr. 6, 2009, pp. 86-92, IET Optoelectronics, vol. 3, Issue 2, The Institution of Engineering and Technology.
International Search Report, Application No. PCT/EP2009/056701, dated Feb. 17, 2010, 3 pages.
"Optical monitoring for DWDM systems", ITU-T Recommendation G.697, Jun. 2004, 24 pages.

* cited by examiner

*Primary Examiner* — Leslie Pascal
*Assistant Examiner* — Casey Kretzer
(74) *Attorney, Agent, or Firm* — Blakely Sokoloff Taylor & Zafman LLP

(57) ABSTRACT

A method of monitoring optical parameters of a modulated optical signal comprises receiving a first optical power, $X_i$, of said optical signal for a first bandwidth, $B_i$, across the said optical signal and receiving a second optical power, $X_j$, of said optical signal for a second bandwidth, $B_j$, across the said optical signal. The method comprises obtaining a power spectral density description of said optical signal. The method comprises determining an optical signal to noise ratio of said optical signal. The optical signal to noise ratio depends on said first optical power, $X_i$, said second optical power, $X_j$, and said power spectral density description. The method also comprises generating a data signal indicative of said optical signal to noise ratio.

24 Claims, 9 Drawing Sheets

MONITORING OPTICAL PARAMETERS OF A MODULATED OPTICAL SIGNAL

CROSS-REFERENCE TO RELATED APPLICATIONS

This application is a National stage of International Application No. PCT/EP2009/056701, filed Jun. 1, 2009, which is hereby incorporated by reference.

FIELD OF THE INVENTION

The invention relates to a method of monitoring optical parameters of a modulated optical signal and to a network element of a communications network arranged to monitor optical parameters of a modulated optical signal.

BACKGROUND OF THE INVENTION

Spectral measurements of optical signals are made with Optical Spectral Analyzers (OSA) or Power Monitoring Units (PMU) typically at a measurement resolution in the range 0.05 nm to 1 nm. High resolution measurements tend to lose a significant spectral portion of the signal being measured and low resolution measurements capture all the signal power but also a significant amount of noise. In communications networks comprising a number of optical signal channels, where optical channels do not overlap and noise is not significantly filtered, the common solution is to identify the noise floor and measure the noise power of the optical signal, and subtract the noise power in order to obtain the optical signal power, as described in ITU-T Recommendation G.697 "Optical monitoring for DWDM systems". In current and next generation optical transport systems operating at high spectral efficiencies the noise floor is not measurable because it is either strongly filtered or not accessible due to spectral overlap of optical channel signals. One solution that has been proposed assumes that an optical signal exists in only one polarization axis and that optical noise is distributed over both polarization axes. This approach estimates the optical signal to noise ratio (OSNR) by measuring the noise component in the polarization axis orthogonal to that of the optical signal to thus obtain the noise component of the optical signal. This method intrinsically suffers from Polarization Dependent Loss and is not applicable to polarization multiplexed signal modulation formats.

SUMMARY OF THE INVENTION

It is an object to provide an improved method of monitoring optical parameters of a modulated optical signal. It is a further object to provide an improved network element of a communications network.

A first aspect of the invention provides a method of monitoring optical parameters of a modulated optical signal. The method comprises receiving a first optical power, $X_i$, of said optical signal for a first bandwidth, $B_i$, across the said optical signal. The method further comprises receiving a second optical power, $X_j$, of said optical signal for a second bandwidth, $B_j$, across the said optical signal. The method further comprises obtaining a power spectral density description of said optical signal. The method further comprises determining an optical signal to noise ratio of said optical signal. Said optical signal to noise ratio depends on said first optical power, $X_i$, said second optical power, $X_j$, and said power spectral density description. The method further comprises generating a data signal indicative of said optical signal to noise ratio.

The method enables an optical signal to noise ratio to be monitored even where a noise floor cannot be measured, since only the total optical power of the optical signal is required to be measured across two bandwidths of the signal.

In an embodiment, said power spectral density description comprises a first k number, $k_i$, and a second k number, $k_j$. Said first k number, $k_i$, depends on a total noiseless optical power of said optical signal to an optical power determined from a power spectral density of said optical signal across said first bandwidth, $B_i$. Said second k number, $k_j$, depends on said total noiseless optical power of said optical signal to an optical power determined from said power spectral density of said optical signal across said second bandwidth, $B_j$. The method further comprises obtaining a reference bandwidth, $B_0$. The method further comprises measuring said first optical power, $X_i$, of said optical signal. The said first optical power is measured across said first bandwidth, $B_i$. The method further comprises measuring said second optical power, $X_j$, of said optical signal. The said second optical power is measured across said second bandwidth, $B_j$. The method further comprises determining said optical signal to noise ratio, osnr, of said optical signal as:

$$osnr = \frac{\frac{B_j}{B_0}X_i - \frac{B_i}{B_0}X_j}{\frac{X_j}{k_i} - \frac{X_i}{k_j}}$$

The method thus provides a computationally light solution to monitoring optical signal parameters of a modulated optical signal, since only two optical power measurements are required and a single calculation provides optical signal to noise ratio. The method enables optical signal to noise ratio monitoring to be performed in real-time, locally at the point where the optical power measurements are made.

In an embodiment, the method further comprises determining an optical signal power, S, of said optical signal. Said optical signal power depends on said first optical power, Xi, and said optical signal to noise ratio. The method further comprises generating a further data signal indicative of said optical signal power.

In an embodiment, said optical signal power is determined as:

$$S = \frac{X_i}{\frac{1}{k_i} + \frac{1}{osnr}\frac{B_i}{B_0}}$$

The method enables an optical signal power level (i.e. optical power without noise power) to be monitored even where a noise floor cannot be measured, since only the total optical power of the optical signal is required to be measured.

In an embodiment, each said optical power is measured using a power monitoring unit. Said method comprises setting a resolution of said power monitoring unit to said first bandwidth, $B_i$, and measuring said first optical power, $X_i$. Said method further comprises setting said resolution of said power monitoring unit to said second bandwidth, $B_j$, and measuring said second optical power, $X_j$.

The method can be implemented using commercially available power monitoring units without requiring any additional hardware and is thus simple and practical to implement.

In an embodiment, the method further comprises storing said first optical power and said second optical power prior to determining said optical signal to noise ratio.

In an embodiment, said method further comprises receiving a power spectral density description. Said power spectral density description comprises a plurality of k numbers, including said first k number, $k_i$, and said second k number, $k_j$, for each of a respective one of a said plurality of bandwidths, including said first bandwidth, $B_i$, and said second bandwidth, $B_j$. Said first k number and said second k number are obtained from said plurality of k numbers. In an embodiment, said power spectral density description is received from an optical transmitter card operable to generate said modulated optical signal. Said power spectral density description is stored within said card. The power spectral density can thus be provided locally to the optical signal.

In an embodiment, said method further comprises obtaining a total noiseless optical power of said optical signal and a power spectral density of said optical signal. Said method comprises obtaining said first k number, $k_i$, and said second k number, $k_j$, by calculating said first k number and said second k number. Said first k number, $k_i$, is calculated as the ratio of said total noiseless optical power of said optical signal to an optical power determined from said power spectral density of said optical signal across said first bandwidth, $B_i$. Said second k number, $k_j$, is calculated as said total noiseless optical power of said optical signal to an optical power determined from said power spectral density of said optical signal across said second bandwidth, $B_j$.

The power spectral density may be obtained by measurement of said optical signal or may be specified as a predetermined value. The said k number may be calculated from said measured power spectral density or from said specified power spectral density value. Said total noiseless optical power of said optical signal is specified as a predetermined value.

The method can thus be applied both when a power spectral density description is available for the said optical signal and when only the power spectral density and total noiseless optical power of the said optical signal are known.

In an embodiment, said modulated optical signal comprises an optical channel of a communications network comprising a plurality of optical channels. The method enables optical signal parameters to be monitored for a modulated optical channel that comprises one of a plurality of closely spaced optical channels for which it is not possible to measure the noise floor between the channels.

In an embodiment, the method comprises monitoring optical signal parameters of each of said plurality of optical channels. A said first optical power, $X_i$, is received for each said optical channel using a said first bandwidth, $B_i$. A said second optical power, $X_j$, is received for each said optical channel using a said second bandwidth, $B_j$. A said optical signal to noise ratio, osnr, is determined for each said optical channel. The method is not dependent upon the modulation format or bit rate applied to the optical signal and each optical channel may be modulated with a different modulation format or bit rate.

In an embodiment, one or more of said first k number, $k_i$, said second k number, $k_j$, said reference bandwidth, $B_0$, said first bandwidth, $B_i$, and said second bandwidth, $B_j$, is different for each said optical channel. The bandwidths can thus be selected to maximise the accuracy of the optical signal parameters monitored for each channel using the method.

In an embodiment, each of said first bandwidth, $B_i$, and said bandwidth, $B_j$, is not lower than a maximum resolution of said power monitoring unit and is not higher than a channel spacing of said plurality of optical channels.

A second aspect of the invention provides a network element of a communications network. Said network element comprises a processor. Said processor is arranged to receive a first optical power, $X_i$, of an optical signal for a first bandwidth, $B_i$, across said optical signal. Said processor is arranged to receive a second optical power, $X_j$, of said optical signal for a second bandwidth, $B_j$, across said optical signal. Said processor is arranged to obtain a power spectral density description of said optical signal. Said processor is arranged to determine an optical signal to noise ratio of said optical signal. Said optical signal to noise ratio depends on said first optical power, $X_i$, said second optical power, $X_j$, and said power spectral density description. Said processor is arranged to generate a data signal indicative of said optical signal to noise ratio.

The network element is able to monitor an optical signal to noise ratio even where a noise floor cannot be measured, since only the total optical power of the optical signal is measured across two bandwidths.

In an embodiment, said power spectral density description comprises a first k number, $k_i$, and a second k number, $k_j$. Said first k number, $k_i$, is dependent on a total noiseless optical power of said optical signal and an optical power determined from a power spectral density of said optical signal across said first bandwidth, $B_i$. Said second k number, $k_j$, is dependent on said total noiseless optical power and an optical power determined from said power spectral density across said second bandwidth, $B_j$. Said network element further comprises a power monitoring unit. Said power monitoring unit is arranged to receive part of an optical signal. Said power monitoring unit is further arranged to measure said first optical power, $X_i$, of said optical signal across said first bandwidth, $B_i$. Said power monitoring unit is further arranged to measure said second optical power, $X_j$, of said optical signal across said second bandwidth, $B_j$. Said processor is further arranged obtain a reference bandwidth, $B_0$. Said processor is further arranged to determine said optical signal to noise ratio, osnr, as $$osnr = \frac{\frac{B_j}{B_0}X_i - \frac{B_i}{B_0}X_j}{\frac{X_j}{k_i} - \frac{X_i}{k_j}}$$

The calculation of the optical signal to noise ratio is computationally light and thus optical signal to noise ratio monitoring can be done in real-time and can be performed within the network element itself.

In an embodiment, said processor is further arranged to determine an optical signal power, S, of said optical signal. Said optical signal power depends on said first optical power, $X_i$, and said optical signal to noise ratio. Said processor is further arranged to generate a further data signal indicative of said optical signal power.

In an embodiment, said processor is arranged to determine said optical signal power, S, of said optical signal as:

$$S = \frac{X_i}{\frac{1}{k_i} + \frac{1}{osnr}\frac{B_i}{B_0}}$$

The network element is able to monitor an optical signal power level (i.e. optical power without noise power) even where a noise floor cannot be measured, since only the total optical power of the optical signal is required to be measured.

In an embodiment, said network element further comprises a memory device. Said network element is arranged to receive a power spectral density description. Said power spectral density description comprises a plurality of k numbers, including said first k number, $k_i$, and said second k number, $k_j$, for each of a respective one of a said plurality of bandwidths, including said first bandwidth, $B_i$, and said second bandwidth, $B_j$. Said network element is arranged to store said power spectral density description in said memory device. Said processor is arranged to obtain said first k number and said second k number from said plurality of k numbers stored in said memory device.

In an embodiment, said network element is further arranged to store said measured first optical power and said measured second optical power prior to determining said optical signal to noise ratio.

In an embodiment, a filtering function is provided and stored within said memory device. Said processor is further arranged to apply said filtering function to said power spectral density description. Said power spectral density description is thereby modified. Said processor is further arranged to generate a power spectral density description signal containing said modified power spectral density description. Said modified power spectral density description comprises a set of modified k numbers. Said modified power spectral density description signal may then be transmitted to a further network element as described above. Filtering of an optical signal by a network element may thus be accounted for in determining optical signal power parameters of the optical signal at a subsequent network element.

In an embodiment, said modified power spectral density description signal is transmitted on an optical supervisory channel of a communications network comprising said network element.

In an embodiment, said network element further comprises a memory device. Said network element is arranged to receive a total noiseless optical power of said optical signal and a power spectral density of said optical signal. Said processor is arranged to obtain said first k number, $k_i$, and said second k number, $k_j$, by calculating said first k number and said second k number. Said first k number, $k_i$, is calculated as a ration of said total noiseless optical power of said optical signal to an optical power determined from said power spectral density of said optical signal across said first bandwidth, $B_i$. Said second k number, $k_j$, is calculated as the ratio of said total noiseless optical power of said optical signal to an optical power determined from said power spectral density of said optical signal across said second bandwidth, $B_j$. Said processor is further arranged to generate a power spectral density signal containing said modified power spectral density. Said modified power spectral density signal may then be transmitted to a further network element as described above.

In an embodiment, said modified power spectral density signal is transmitted on an optical supervisory channel of a communications network comprising said network element.

The network element is thus able to monitor optical signal parameters both when a power spectral density description is available for the said optical signal and when only the power spectral density and total noiseless optical power of the said optical signal are known. In an embodiment, aid network element further comprises optical signal power control apparatus. Said optical signal power control apparatus is arranged to receive said further data signal and to control said optical power of said optical signal depending on said determined optical signal power, S.

In an embodiment, said modulated optical signal comprises an optical channel of a communications network comprising a plurality of optical channels. The network element is thus able to monitor optical signal parameters for a modulated optical channel that comprises one of a plurality of closely spaced optical channels for which it is not possible to measure the noise floor between the channels. In an embodiment, said power monitoring unit is arranged to receive part of each of said plurality of optical channels. Said processor is arranged to receive a said first optical power, $X_i$, for each said optical channel across a said first measurement bandwidth, $B_i$. Said power monitoring unit is arranged to receive a said second optical power, $X_j$, for each said optical channel across a said second measurement bandwidth, $B_j$. Said processor is arranged to determine a said optical signal to noise ratio, osnr, for each said optical channel. The network element is able to monitor optical signal parameters independently to the modulation format or bit rate applied to the optical signal and can monitor optical signal parameters for optical channels each modulated with a different modulation format or bit rate.

In an embodiment, said processor is further arranged to determine a said optical signal power, S, for each said optical channel.

In an embodiment, one or more of said first bandwidth, $B_i$, and said second bandwidth, $B_j$, is different for each said optical channel. The bandwidths can thus be selected to maximise the accuracy of the optical signal parameters monitored for each channel.

In an embodiment, each of said first bandwidth, $B_i$, and said second bandwidth, $B_j$, is not lower than a maximum resolution of said power monitoring unit and is not higher than a channel spacing of said plurality of optical channels.

In an embodiment, said network element comprises a network node and said processor comprises a controller of said network node. In an alternative embodiment, said network element comprises one of an optical line amplifier and a wavelength selective switch.

A third aspect of the invention provides a data carrier, such as a non-transitory, computer readable storage medium, having computer readable instructions embodied therein. The said computer readable instructions are for providing access to resources available on a processor. The computer readable instructions comprise instructions to cause the processor to perform any of the above steps of the method of monitoring optical parameters of a modulated optical signal.

Embodiments of the invention will now be described in detail, by way of example only, with reference to the accompanying drawings.

DESCRIPTION OF EMBODIMENTS OF THE INVENTION

Figure 1:
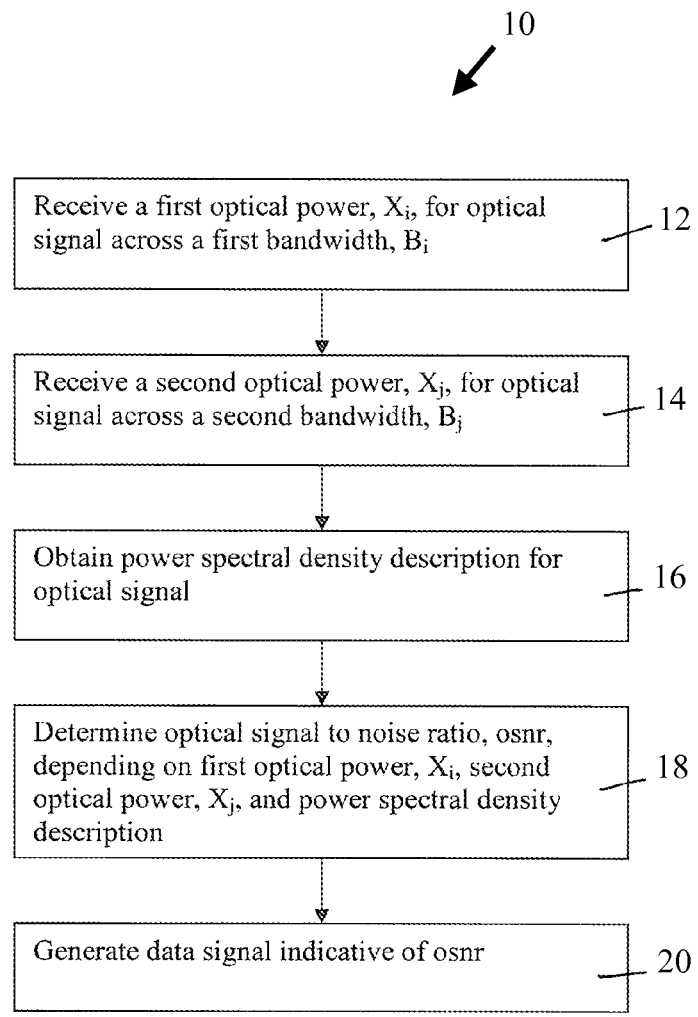
FIG. 1 is a flow chart of a method of monitoring optical parameters of a modulated optical signal according to a first embodiment of the invention.

Referring to FIG. 1, a first embodiment of the invention provides a method 10 of monitoring optical signal parameters of a modulated optical signal. The method 10 comprises receiving 12 a first optical power, $X_i$, of the optical signal. The first optical power, $X_i$, is the optical power of the signal across a first bandwidth, $B_i$, covering at least part of the spectral bandwidth of the optical signal. The method 10 further comprises receiving 14 a second optical power, $X_j$, of the optical signal. The second optical power, $X_j$, is the optical power of the signal across a second bandwidth, $B_j$, covering at least part of the spectral bandwidth of the optical signal. Two optical power values of the optical signal are thus received, each providing the optical power of the optical signal within a different amount of the spectral bandwidth of the optical signal.

The method 10 further comprises receiving a power spectral density description of the optical signal. The method then comprises determining the optical signal to noise ratio, OSNR, 18 of the optical signal, which depends on the first optical power, $X_i$, the second optical power, $X_j$, and the power spectral density description of the optical signal.

The method also comprises generating a data signal indicative of the so determined OSNR.

The method 10 is thus able to monitor the osnr of an optical signal without needing to determine the noise power within the optical signal and without needing to identify the noise floor of the optical signal. This is very useful in situations, such as close packed optical channels within a communications network, in which the noise floor cannot be identified due to signal filtering or channel spectral overlap.

The resulting OSNR can be used within optical signal control systems in order to, for example, compare the OSNR of the optical signal with system design parameters including maximum acceptable OSNR.

Figure 2:
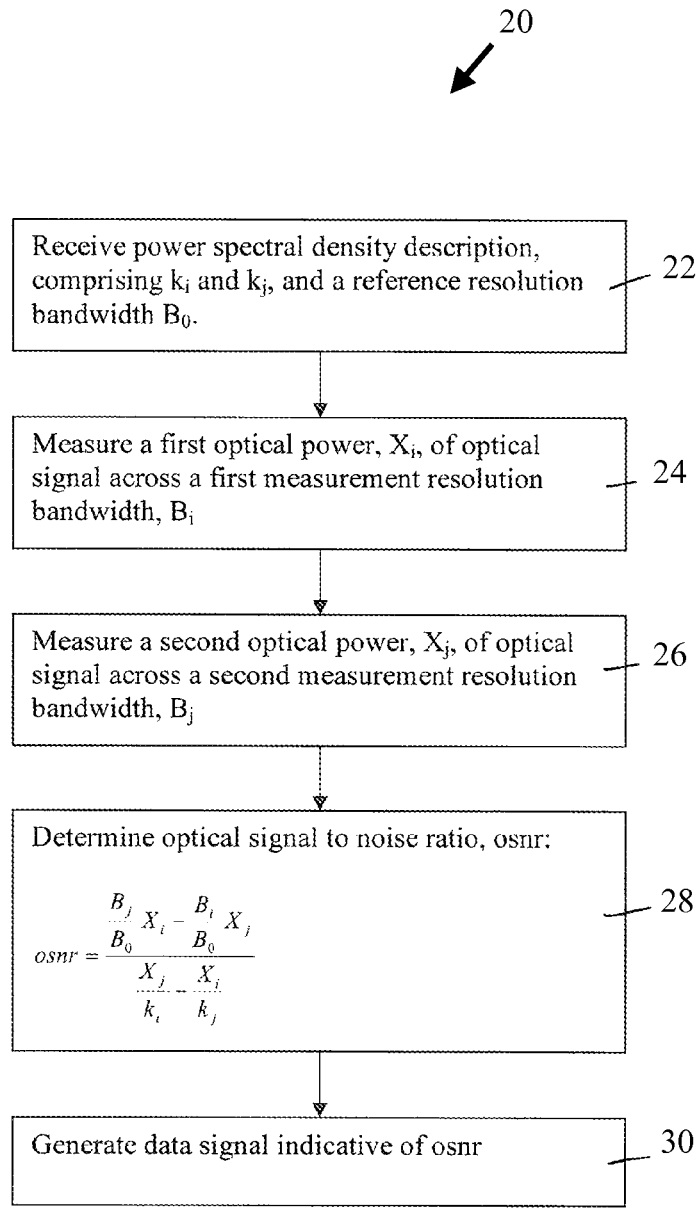
FIG. 2 is a flow chart of a method of monitoring optical parameters of a modulated optical signal according to a second embodiment of the invention.

A second embodiment of the invention provides a method 20 of monitoring optical signal parameters of a modulated optical signal, as shown in FIG. 2. In this example, the modulated optical signal comprises a channel of a communications network.

In this embodiment, the power spectral density description is obtained by receiving a power spectral density description 22 comprising a first k number, $k_i$, and a second k number, $k_j$. The method also comprises receiving a reference optical resolution bandwidth, $B_0$. The k numbers are defined as, giving the example of k:

$$k_i = \frac{S}{S_i} = \frac{S}{\int_{f_0-B_i/2}^{f_0+B_i/2} S(f)\,df} \quad \text{(Equation 1)}$$

where S is the total noiseless optical signal power (i.e. the optical power of the optical signal without any noise power), in this example bounded to the ITU-T frequency slot of the optical channel, $S(f)$ is the power spectral density of the optical signal, $f_0$ is the optical signal carrier frequency, $B_i$ is a first bandwidth, and $S_i$ is the optical signal power captured within the first bandwidth. The total noiseless optical signal power, S, is a communications network design parameter.

The second ratio, $k_j$, is similarly defined as $$k_j = \frac{S}{S_j} = \frac{S}{\int_{f_0-B_j/2}^{f_0+B_j/2} S(f)\,df}$$

where $B_j$ is a second bandwidth and $S_j$ is the optical signal power captured within the second bandwidth.

The reference optical resolution bandwidth, $B_0$, is set in this example as 12.5 GHz (0.1 nm).

In this example, the first optical power, $X_i$, and the second optical power, $X_j$, are received by measuring the optical powers across the two different bandwidths, $B_i$, and $B_j$. It will be understood by the person skilled the art that in this context the bandwidth across which the measurement is made is what is referred to as the resolution of the measurement apparatus used to make the measurement. The measurement 24 of the optical power across the first bandwidth $B_i$ (i.e. using a first resolution $B_i$ for the measurement) provides the first optical power, $X_i$, for the optical signal. The measurement 26 of the optical power across the second bandwidth $B_j$ (i.e. using a second resolution $B_j$ for the measurement) provides the second optical power, $X_j$, for the optical signal.

The values set for $B_i$ and $B_j$ must be different and cannot be lower than the highest available resolution of the apparatus used to measure the optical power and cannot be lower than the channel spacing of the communications network. The optical signal to noise ratio, OSNR, is determined 19 using the equation:

$$osnr = \frac{\frac{B_j}{B_0}X_i - \frac{B_i}{B_0}X_j}{\frac{X_j}{k_i} - \frac{X_i}{k_j}} \quad \text{(Equation 2)}$$

A data signal is then generated 19 which is indicative of the OSNR value determined for the optical signal.

Equation 2 is obtained as follows:

Let $X_i = X(B_i)$ be the optical power measured by a square filter with bandwidth $B_i$ when noise is also present and let $S_i$ be the signal power captured within the power measurement. Assuming an in-band noise spectral density n we have:

$$X_i = S_i + nB_i = \frac{S}{k_i} + \frac{S}{osnr_i} \quad \text{(Equation 3)}$$

The optical signal to noise ratio for the filter with bandwidth $B_i$ is given by $$osnr_i = \frac{S}{nB_i} = \frac{S}{nB_i}\frac{B_0}{B_0} = \frac{S}{nB_0}\frac{B_0}{B_i} = osnr\frac{B_0}{B_i} \quad \text{(Equation 4)}$$

Inserting equation 4 into equation 3, gives $$X_i = \frac{S}{k_i} + \frac{S}{osnr_i} = S\left(\frac{1}{k_i} + \frac{1}{osnr_i}\right) = S\left(\frac{1}{k_i} + \frac{1}{osnr\frac{B_i}{B_0}}\right) \quad \text{(Equation 5)}$$

and rearranging equation 5 gives, the signal power S $$S = \frac{X_i}{\frac{1}{k_i} + \frac{1}{osnr}\frac{B_i}{B_0}} \quad \text{(Equation 6)}$$

where osnr is the optical signal to noise ratio at the reference resolution, $B_0$. The first term in the denominator of equation 6 takes into account the signal power being lost in a measurement with a finite bandwidth and the second term considers the amount of noise captured in the measurement.

When the optical power of the signal is measured at two different bandwidths, $B_i$ and $B_j$, we get $$S = \frac{X_i}{\frac{1}{k_i} + \frac{1}{osnr}\frac{B_i}{B_0}} = \frac{X_j}{\frac{1}{k_j} + \frac{1}{osnr}\frac{B_j}{B_0}} \quad \text{(Equation 7)}$$

One solution of this pair of nonlinear equations is null (where S=0 and osnr=0) and the other solution allows equation 7 to be rearranged to form equation 2.

The values of the bandwidths can be set as desired, and can be varied in order to mitigate measurement errors and obtain the most reliable solution to equation 2.

A third embodiment of the invention provides a method of monitoring optical signal parameters of a modulated optical signal and is substantially the same as the method 10 shown in FIG. 1, with the following modification. In this embodiment the method 10 further comprises determining an optical signal power, S, of the optical signal. The optical signal power depends on the first optical power, $X_i$, and the optical signal to noise ratio, OSNR. The method further comprises generating a further data signal indicative of the so determined optical signal power.

Figure 3:
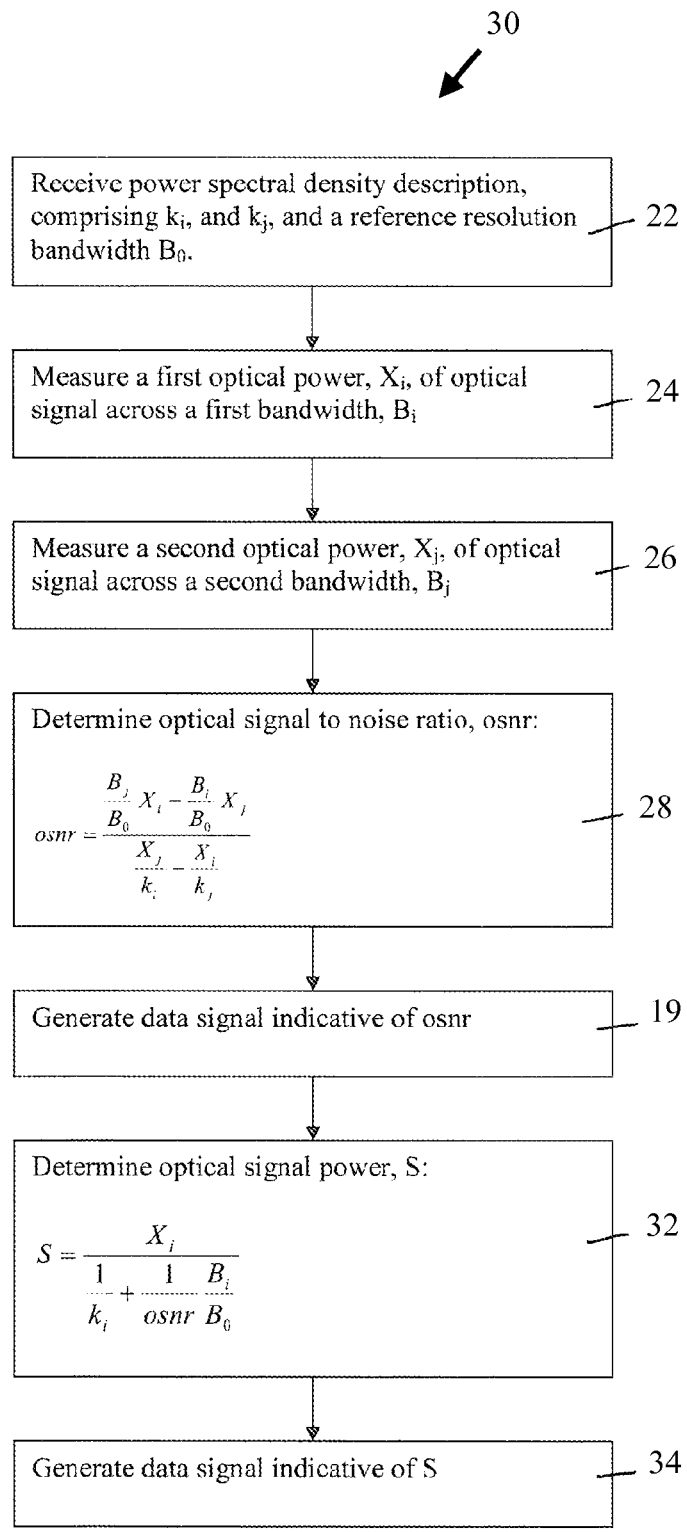
FIG. 3 is a flow chart of a method of monitoring optical parameters of a modulated optical signal according to a fourth embodiment of the invention.

A fourth embodiment of the invention provides a method 30 of monitoring optical signal parameters of a modulated optical signal, as shown in FIG. 3. The method 30 of this embodiment is substantially the same as the method 20 of the second embodiment, with the following modifications. The same reference numbers are retained for corresponding features.

In this embodiment, following determining the optical signal to noise ratio, OSNR, of an optical signal the method further comprises determining 32 the optical signal power, S, being the power of the optical signal excluding noise power. The optical signal power, S, is determined using equation 6.

The method further comprises generating 34 a data signal indicative of the optical signal power, S.

Figure 4:
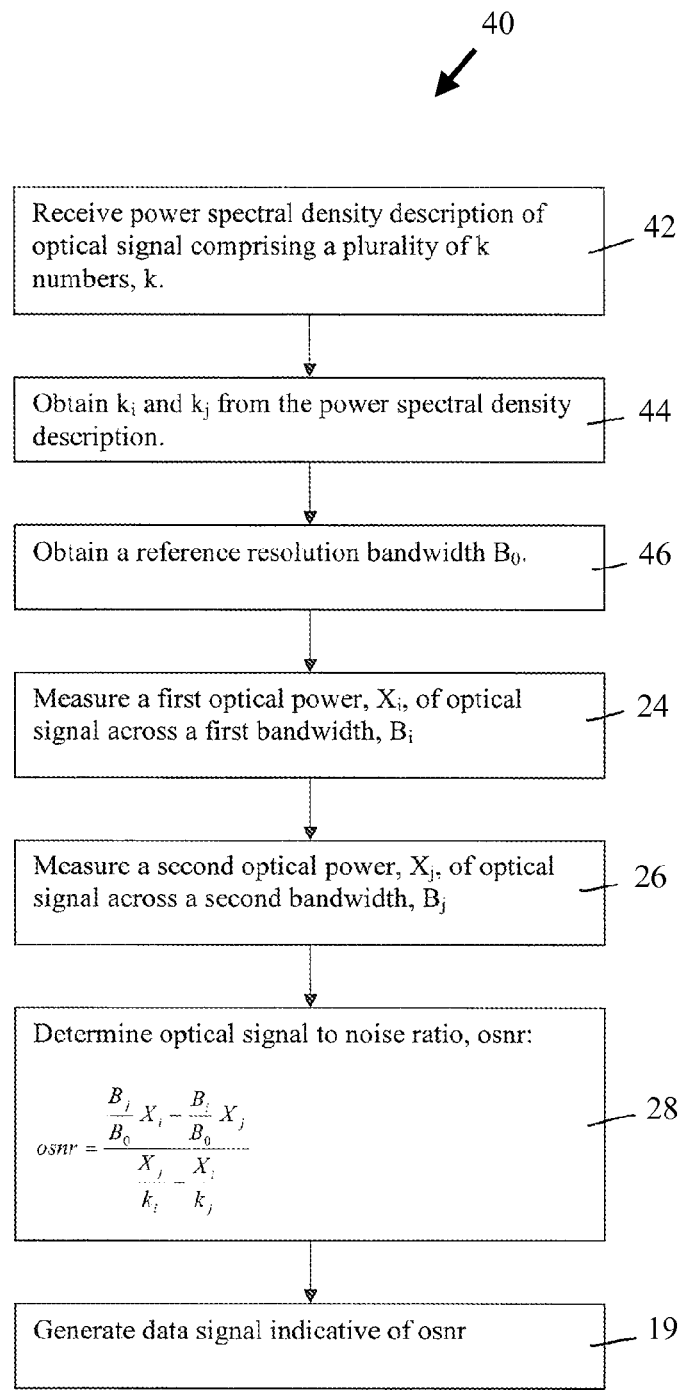
FIG. 4 is a flow chart of a method of monitoring optical parameters of a modulated optical signal according to a fifth embodiment of the invention.

Referring to FIG. 4, a fifth embodiment of the invention provides a method 40 of monitoring optical signal parameters of a modulated optical signal. The method 40 of this embodiment is substantially the same as the method 20 of the second embodiment, with the following modifications. The same reference numbers are retained for corresponding features.

Figure 5:
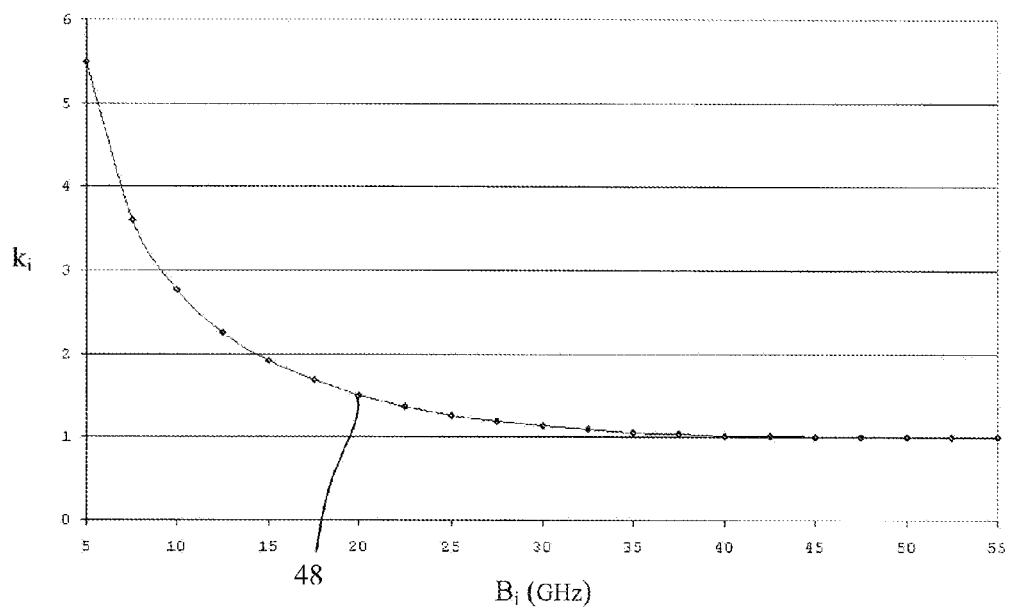
FIG. 5 is a plot of ratios, $k_i$, for a plurality of measurement optical resolution bandwidths, Bi for a 43 GHz RZ-DQPSK modulated optical signal.

In this embodiment the method 40 comprises receiving a power spectral density, PSD, description 42 which comprises a plurality of k numbers, k, as defined above in equation 1. Each k number, k, corresponds to a different bandwidth, B. An example of a set of k numbers, k, comprising a PSD description for an optical channel comprising an optical signal modulated with a 43 GHz RZ-DQPSK (return to zero-duo quaternary phase shift key) modulation format, is shown in FIG. 5. The PSD description shown in FIG. 4 comprises twenty-one ratios, k, ('k numbers').

The PSD description is generated by calculating each of a plurality of k number using equation 1, for a known value of the total noiseless optical signal power bounded to the ITU-T frequency slot of the optical channel, $S_0$, and a known power spectral density of the optical channel, S(f). The value of $S_0$ is a network design parameter and is a pre-set value. The power spectral density, S(f), of the channel can be obtained by measurement, for example in a factory setting following manufacture of an optical transmitter card comprising an optical transmitter configured to generate the optical signal, or can be specified as a system design parameter. Where S(f) is obtained by measurement, the measurement of the optical power of the signal is made at a very high resolution, typically 10 pm, across the spectral bandwidth of the optical signal. The resulting power spectral density description is stored within the transmitter card and the card is configured to transmit the power spectral density description within a data signal as required. The power spectral density description is received within a said data signal transmitted by the transmitter card.

The set of k numbers, k, comprising the power spectral density includes two values which are selected as the first k number, $k_i$, and the second k number, $k_j$, and the first and second k numbers are thus obtained from the power spectral density description provided by the transmitter card.

It will be appreciated that a power spectral density description may similarly be generated in this manner for delivery in the method 20 of the second embodiment.

Figure 6:
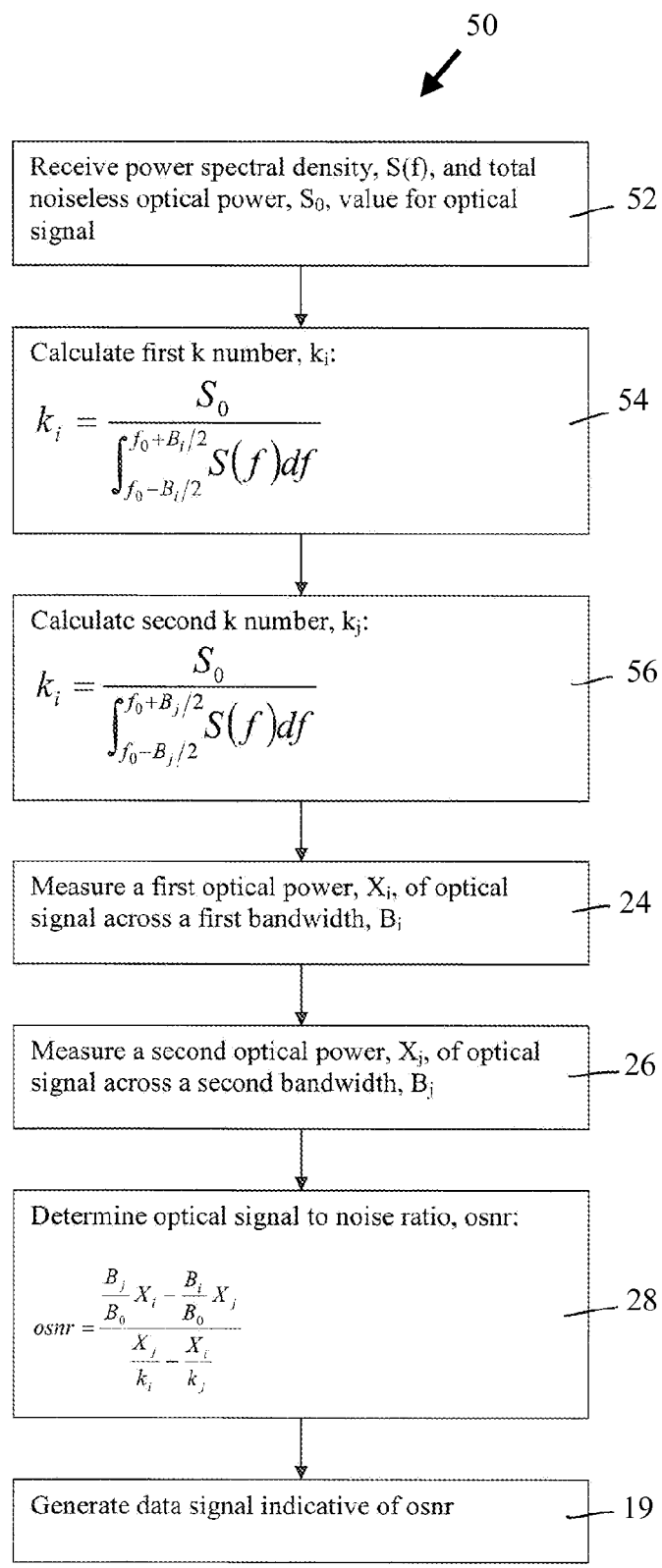
FIG. 6 is a flow chart of a method of monitoring optical parameters of a modulated optical signal according to a sixth embodiment of the invention.

Referring to FIG. 6, a sixth embodiment of the invention provides a method 50 of monitoring optical signal parameters of a modulated optical signal. The method 50 of this embodiment is substantially the same as the method 20 of the second embodiment, with the following modifications. The same reference numbers are retained for corresponding features.

In this embodiment the method 50 further comprises receiving 52 a power spectral density, S(f), and a total noiseless optical power, $S_0$, 52. The value of $S_0$ is a network design parameter and is a pre-set value. The power spectral density, S(f), of the channel can be obtained by measurement, for example in a factory setting following manufacture of an optical transmitter card comprising an optical transmitter configured to generate the optical signal, or can be specified as a system design parameter. Where S(f) is obtained by measurement, the measurement of the optical power of the signal is made at a very high measurement resolution bandwidth, typically 10 pm, across the spectral bandwidth of the optical signal. S(f) and $S_0$ are stored within the transmitter card and the card is configured to transmit S(f) and $S_0$ within a data signal as required.

In this embodiment, the method 50 comprises receiving the S(f) and $S_0$ values 52 and, for two selected bandwidths, $B_i$ and $B_j$, calculating a first k number, $k_i$, 54 and a second k number, $k_j$, 56 using equation 1.

Figure 7:
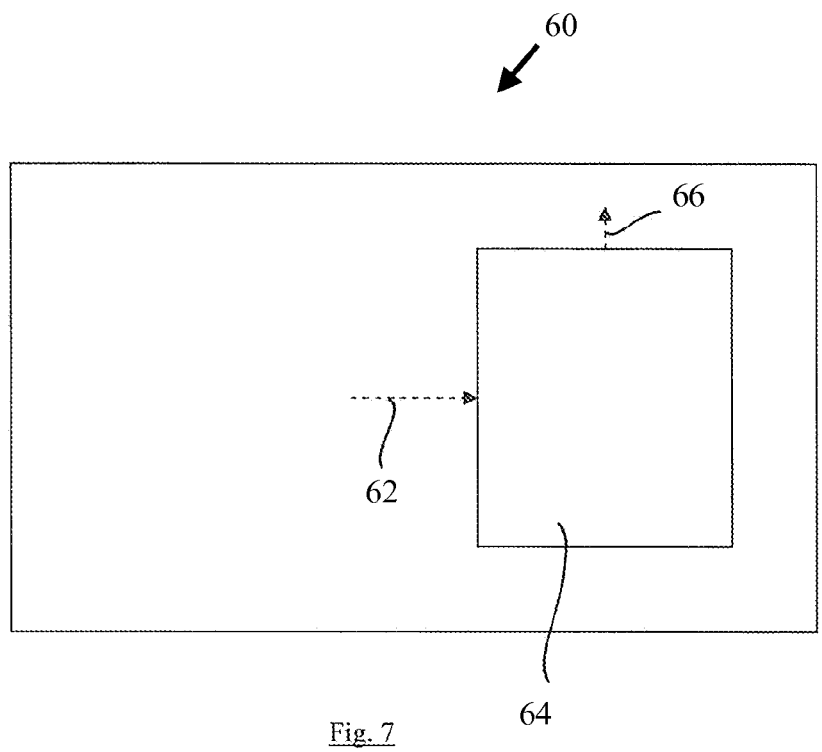
FIG. 7 is a schematic representation of a network element according to a sixth embodiment of the invention.

Referring to FIG. 7, a seventh embodiment of the invention provides a network element 60 of a communications network. The network element 60 comprises a processor 64, which in this example comprises a microprocessor.

The processor 64 is arranged to receive a first optical power, $X_i$, of an optical signal 62. The first optical power, $X_i$, is the optical power of the optical signal across a first bandwidth, $B_i$, covering at least part of the spectral bandwidth of the optical signal. The processor 64 is further arranged to receive a second optical power, $X_j$, of an optical signal 64. The second optical power, $X_j$, is the optical power of the optical signal across a second bandwidth, $B_j$, covering at least part of the spectral bandwidth of the optical signal.

The processor 64 is arranged to obtain a power spectral density description of the optical signal. The processor 64 is further arranged to determine an optical signal to noise ratio, OSNR, of the optical signal. The OSNR depends on the first optical power, $X_i$, the second optical power, $X_j$, and the power spectral density description.

The processor 64 is also arranged to generate a data signal 66 indicative of the so determined OSNR.

The network element 60 is thus able to monitor the OSNR of an optical signal without needing to determine the noise power within the optical signal and without needing to identify the noise floor of the optical signal. This is very useful in situations, such as close packed optical channels within a communications network, in which the noise floor cannot be identified due to signal filtering or channel spectral overlap.

The resulting OSNR can be used by the network element or within optical signal control systems in order to, for example, compare the OSNR of the optical signal with system design parameters including maximum acceptable OSNR.

Figure 8:
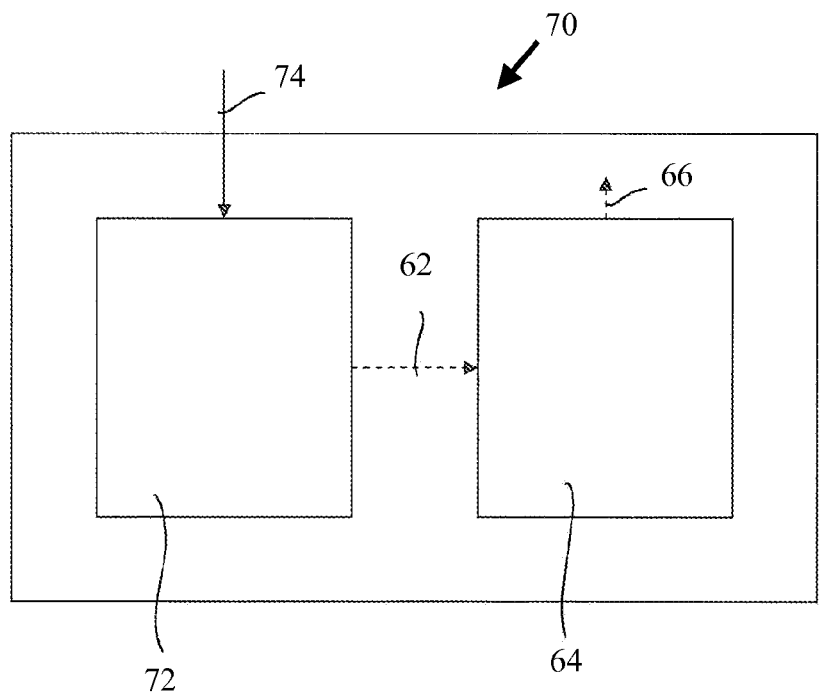
FIG. 8 is a schematic representation of a network element according to an eighth embodiment of the invention.

An eighth embodiment of the invention provides a network element 70, as shown in FIG. 8. The network element 70 is substantially the same as the network element 60 of the previous embodiment, with the following additions. The same reference numbers are retained for corresponding features.

The network element 70 of this embodiment comprises a power monitoring unit (PMU) 72 and a processor 64.

The PMU 72 is arranged to receive part of an optical signal 74, which has been tapped off from an optical channel of the communications network. The PMU 72 is arranged to measure the optical power of the optical signal at two different resolutions (bandwidths) $B_i$ and $B_j$. The resolutions are selected by a user or system designer and the PMU 72 is set to make measurements at these two resolutions.

The measurement made by the PMU 72 at the first resolution, $B_i$, provides a first value for the optical power, $X_i$, of the said optical signal. The measurement made by the PMU 72 at the second resolution, $B_j$, provides a second value for the optical power, $X_j$, of the optical signal. The processor 64 is arranged to receive the optical powers measured by the PMU 72. The processor 64 is also arranged to obtain a reference optical resolution bandwidth, $B_0$.

In this embodiment, the power spectral density description comprises a first k number, $k_i$, dependent on a total noiseless optical power of said optical signal and an optical power determined from a power spectral density of said optical signal across said first bandwidth, $B_i$, and a second k number, $k_j$, dependent on said total noiseless optical power and an optical power determined from said power spectral density across said second bandwidth, $B_j$.

The processor 64 arranged to determine an optical signal to noise ratio, OSNR, of the said optical signal. The OSNR is determined using equation 2, set out above.

The processor 64 is arranged to, following calculation of the osnr, generate a data signal 66 indicative of the OSNR.

A ninth embodiment of the invention provides a network element 70 as shown in FIG. 8 and substantially as described above, with the following modification. In this embodiment the processor 64 of the network element 70 is further arranged, following calculation of the OSNR, to determine an optical signal power, S, for the said optical signal. The optical signal power, S, depends on the first optical power, $X_i$, and the OSNR. The processor 64 is also arranged to generate a further data signal indicative of the signal power, S.

Figure 9:
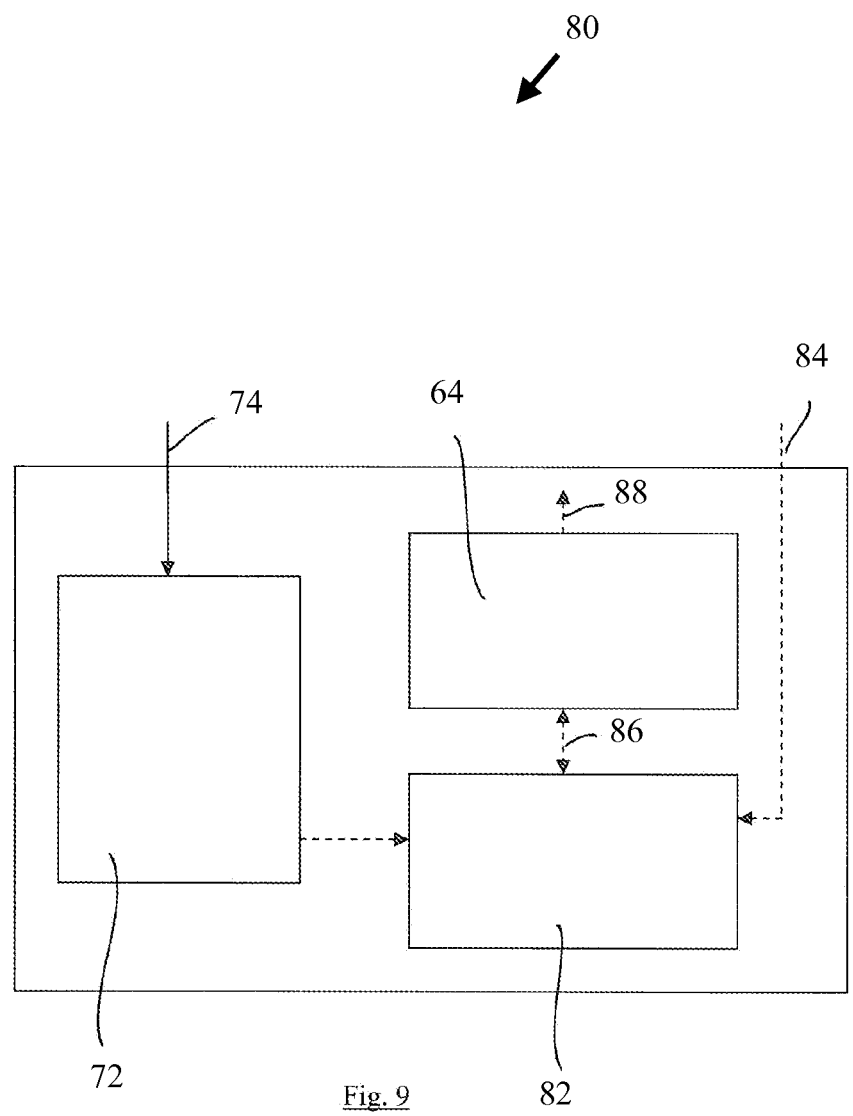
FIG. 9 is a schematic representation of a network element according to a ninth embodiment of the invention.

A tenth embodiment of the invention provides a network element 80 as shown in FIG. 9. The network element 80 of this embodiment is substantially the same as the network element 70 of the previous embodiment, with the following modifications. The same reference numbers are retained for corresponding features.

In this embodiment, the network element 80 further comprises a memory device 82, arranged for communication with the PMU 72 and the processor 64, as indicated. The memory device 82 is arranged to receive and store the measured first and second optical signal powers, $X_i$ and $X_j$, from the PMU 72. The memory device 82 is further arranged to receive and store a power spectral density description 84 for the optical signal to be monitored 74. The power spectral density description 84 comprises a plurality of k numbers, k, as described above.

The processor 64 is operable to receive the first optical power measurement $X_i$ and the second optical power measurement $X_j$ from the memory device 82. The processor 64 is arranged to obtain the first k number, $k_i$, and the second k number, $k_j$, from the plurality of k number stored in the memory device 82.

The processor 64 is arranged to determine an optical signal to noise ratio, OSNR, of the said optical signal using equation 2 and to generate a data signal 88 indicative of the osnr, as described above.

In an eleventh embodiment the processor 64 of the network element 80 is further arranged to send a data signal 86 containing the OSNR to the memory device 82, where it is stored. The processor 64 is further arranged to subsequently obtain the OSNR from the memory device 82 and to determine an optical signal power for the said optical signal, using equation 6. The processor 64 is also arranged to generate a further data signal 88 containing the signal power, as described above.

A twelfth embodiment of the invention provides a network element 80 as shown in FIG. 9. The network element 80 is substantially as described above in relation to the previous embodiment of the invention, with the following modifications.

In this embodiment, the network element 80 is arranged to receive a total noiseless optical power, $S_0$, and a power spectral density, $S(f)$, of said optical signal 84. The total noiseless optical power and the power spectral density are stored within the memory device 82. The processor 64 is arranged to obtain the total noiseless optical power, $S_0$, and the power spectral density, $S(f)$, from the memory device 82 and to calculate the first k number, $k_i$, and the second k number, $k_j$, using equation 1, as described above.

Figure 10:
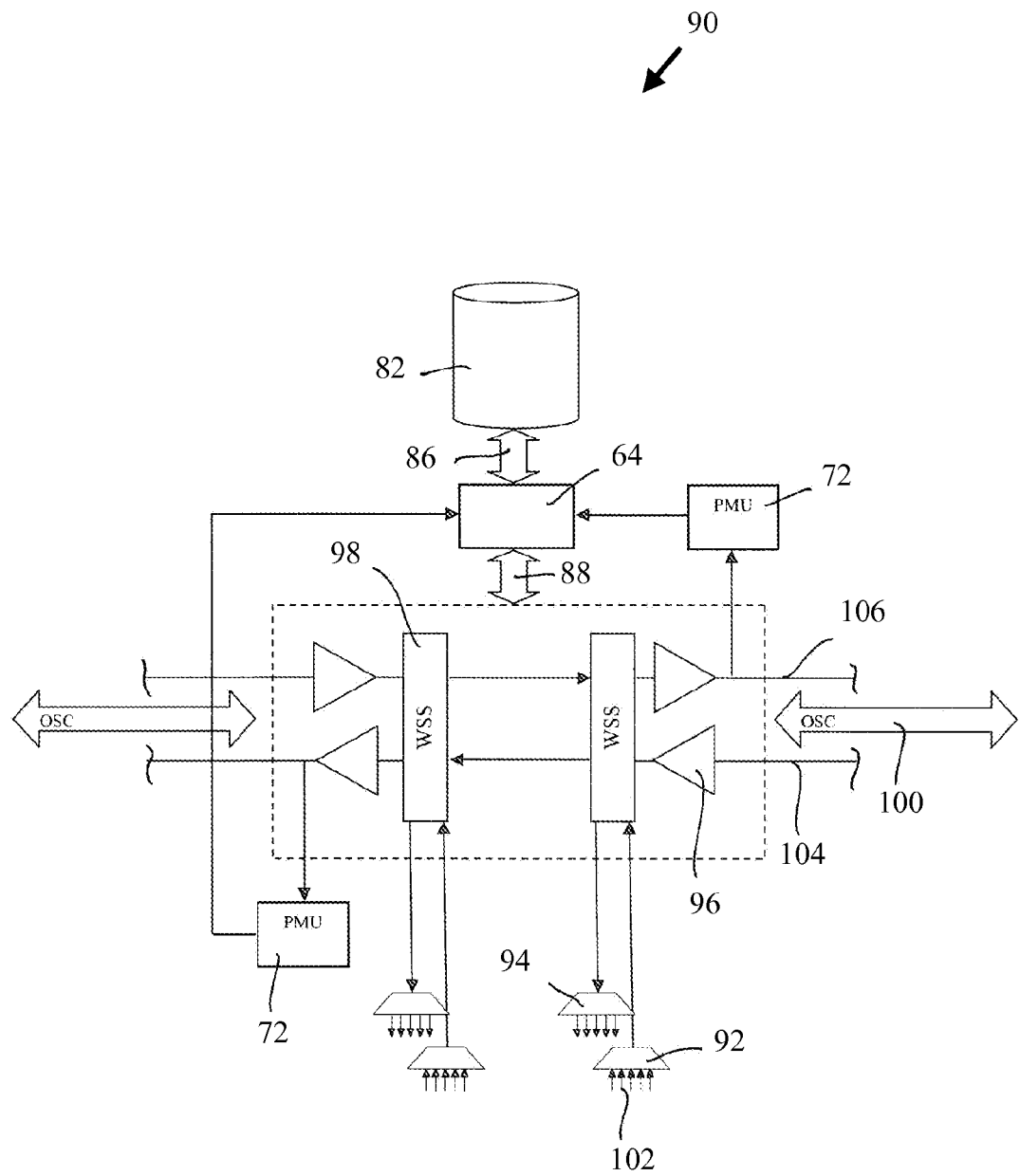
FIG. 10 is a schematic representation of a network node according to a tenth embodiment of the invention.

A thirteenth embodiment of the invention provides a network node 90 of a communications network, as shown in FIG. 10. The network node 90 is generally similar to the network node 80 of FIG. 9, with the following modifications. The same reference numbers are retained for corresponding features.

In this example the processor 64, comprises the node controller. The network node 90 comprises two PMUs 72, a first line trunk 104, a second line trunk 106, first and second wavelength selective switches (WSS) 98, first and second multiplexers 92, first and second demultiplexers 94 and optical amplifiers 96. The node 90 is connected to other similar nodes in the communications network by the line trunks 104; only two line trunks and five optical channels are shown for clarity, but it will be appreciated that in reality a much larger number of line trunks and channels will be present. An optical supervisory channel 100 is provided within the communications network for sending control data between network nodes 90, as will be well known to persons skilled in the art.

Each PMU 72 is arranged to receive an optical signal comprising part of one of the optical channels transmitted through its respective line trunk 104. As described above, each PMU 72 is arranged to measure the optical power of an optical signal at two resolutions, $B_i$ and $B_j$, to provide two optical signal power measurements, $X_i$ and $X_j$. The PMUs 72 are arranged to send the optical signal power measurements to the controller 64, which is arranged to transmit the measurements to the node memory 82, which is arranged to store the measurements.

The node controller 64 is arranged to obtain the corresponding k numbers $k_i$ and $k_j$ from a power spectral density description for a channel to be monitored, as described above, and a reference bandwidth $B_0$, which are stored within the node memory 82. A power spectral density description for each channel to be monitored is received by the node controller 64 via the optical supervisory channel (OSC) 100 and the node memory 82 is arranged to store the power spectral density descriptions.

The node controller 64 is further arranged to determine the optical signal to noise ratio, OSNR, of a selected optical channel using equation 2, as described above. The controller 64 is further arranged to generate a data signal indicative of the OSNR to the node memory 82, which is arranged to store the OSNR value.

The controller 64 in this example is further arranged to determine an optical signal power for the selected optical channel, using equation 6, as described above.

Each PMU 72 is able to make optical signal power measurements for each of a plurality of optical channels being transmitted on the respective line trunk 104. Each PMU 72 is arranged to transmit the optical signal power measurements for each of a plurality of optical channels to the node controller 64, which is arranged to determine the OSNR and optical signal power for each channel. The network node 90 is thus able to monitor optical signal parameters of each of a plurality of optical channels.

In this example, the node controller 64 is further arranged to modify a received power spectral density description to take account of optical filtering applied to the optical channels by the node 90. As will be well known by the person skilled in the art, optical signals in communications networks are often exposed to optical filtering as they are propagate through a data link, particularly on transmission through WSS elements.

In this example, a filtering function to modify the power spectral density description is provided and stored within the node memory 82. The node controller 64 is arranged to obtain the filtering function and the power spectral density description from the node memory 82 and to apply the filtering function to the power spectral density description. The filtering function is applied by multiplying the k numbers of the power spectral density description by the filtering function. The node controller 64 is arranged to store the modified power spectral density description in the node memory 82. The node controller 64 is further arranged to generate a power spectral density description signal indicative of the modified power spectral density description. The node controller 64 is arranged to transmit the power spectral density description signal on the OSC 100, to subsequent network nodes in the communications network. In this way, the power spectral density description received by a subsequent network node remains an accurate description of the power spectral density of the optical channels.

It will be appreciated that the network node 90 may alternatively comprise a terminal network node, i.e. a node only having input and output line trunks on one side, or may comprise any other type of network element at which it is desirable to monitor optical signal parameters, such as optical line amplifiers and wavelength selective switches.

A further embodiment of the invention provides a data carrier having computer readable instructions embodied therein for providing access to resources available on a processor. The computer readable instructions comprise instructions to cause the processor to perform any of the above methods 10, 20, 30, 40, 50 of monitoring optical parameters of a modulated optical signal.

The invention claimed is:

1. A method of monitoring optical parameters of a modulated optical signal, the method comprising:
   receiving a first optical power, $X_i$, of said optical signal for a first bandwidth, $B_i$, across said optical signal;
   receiving a second optical power, $X_j$, of said optical signal for a second bandwidth, $B_j$, across said optical signal;
   obtaining a power spectral density description of said optical signal, wherein said power spectral density description comprises,
      a first k number, $k_i$, dependent on a total noiseless optical power of said optical signal and an optical power determined from a power spectral density of said optical signal across said first bandwidth, $B_i$, and
      a second k number, $k_j$, dependent on said total noiseless optical power and an optical power determined from said power spectral density across said second bandwidth, $B_j$;
   receiving a reference bandwidth, $B_0$;
   measuring said first optical power, $X_i$, of said optical signal across said first bandwidth, $B_i$;
   measuring said second optical power, $X_j$, of said optical signal across said second bandwidth, $B_j$; and
   determining an optical signal to noise ratio, osnr, of said optical signal, said optical signal to noise ratio depending on said first optical power, $X_i$, said second optical power, $X_j$, and said power spectral density description, wherein said osnr is determined as $$osnr = \frac{\frac{B_j}{B_0}X_i - \frac{B_i}{B_0}X_j}{\frac{X_j}{k_i} - \frac{X_i}{k_j}}; \text{ and}$$

generating a data signal indicative of said optical signal to noise ratio.

2. The method as claimed in claim 1, wherein the method further comprises determining an optical signal power, S, of said optical signal, said optical signal power depending on said first optical power, $X_i$, and said optical signal to noise ratio, and generating a further data signal indicative of said optical signal power.

3. The method as claimed in claim 2, wherein said optical signal power, S, is determined as $$S = \frac{X_i}{\frac{1}{k_i} + \frac{1}{osnr}\frac{B_i}{B_0}}.$$

4. The method as claimed in claim 1, wherein each of said optical powers is measured using a power monitoring unit and said method further comprises setting a resolution of said power monitoring unit to said first bandwidth, $B_i$, and measuring said first optical power, $X_i$, and setting said resolution of said power monitoring unit to said second bandwidth, $B_j$, and measuring said second optical power, $X_j$.

5. The method as claimed in claim 1, wherein said method further comprises receiving a power spectral density description comprising a plurality of k numbers for a plurality of bandwidths, including said first bandwidth, $B_i$, and said second bandwidth, $B_j$, wherein said plurality of k numbers includes said first k number, $k_i$, and said second k number, $k_j$, and said first k number and said second k number are obtained from said plurality of k numbers.

6. The method as claimed in claim 1, wherein said method further comprises:
   receiving a total noiseless optical power of said optical signal and a power spectral density of said optical signal; and
   obtaining said power spectral density description by,
      calculating said first k number as the ratio of said total noiseless optical power of said optical signal to an optical power determined from said power spectral density of said optical signal across said first bandwidth, $B_i$, and
      calculating said second k number as said total noiseless optical power of said optical signal to an optical power determined from said power spectral density of said optical signal across said second bandwidth, $B_j$.

7. The method as claimed in claim 1, wherein:
   each of said optical powers is measured using a power monitoring unit;
   said optical signal comprises a plurality of optical channels; and
   each of said first bandwidth, $B_i$, and said second bandwidth, $B_j$, is not lower than a maximum resolution of said power monitoring unit and is not higher than a channel spacing of said plurality of optical channels.

8. A network element of a communications network, the network element comprising:
   a processor arranged to:
      receive a first optical power, $X_i$, of an optical signal for a first bandwidth, $B_i$, across said optical signal;
      receive a second optical power, $X_j$, of said optical signal for a second bandwidth, $B_j$, across said optical signal;
      obtain a power spectral density description of said optical signal, wherein said power spectral density description comprises,
         a first k number, $k_i$, dependent on a total noiseless optical power of said optical signal and an optical power determined from a power spectral density of said optical signal across said first bandwidth, $B_i$, and
         a second k number, $k_j$, dependent on said total noiseless optical power and an optical power determined from said power spectral density across said second bandwidth, $B_j$;
      obtain a reference optical resolution bandwidth, $B_0$;
      determine an optical signal to noise ratio, osnr, of said optical signal, said optical signal to noise ratio depending on said first optical power, $X_i$, said second optical power, $X_j$, and said power spectral density description, and wherein said osnr is determined as $$osnr = \frac{\frac{B_j}{B_0}X_i - \frac{B_i}{B_0}X_j}{\frac{X_j}{k_i} - \frac{X_i}{k_j}}; \text{ and}$$

generate a data signal indicative of said optical signal to noise ratio; and
   a power monitoring unit arranged to:
      receive part of said optical signal;
      measure said first optical power $X_i$, of said optical signal across said first bandwidth, $B_i$; and
      measure said second optical power, $X_j$, of said optical signal across said second bandwidth, $B_j$.

9. The network element as claimed in claim 8, wherein said processor is further arranged to determine an optical signal power, S, of said optical signal, said optical signal power depending on said first optical power, $X_i$, and said optical signal to noise ratio, and to generate a further data signal indicative of said optical signal power.

10. The network element as claimed in claim 9, wherein said processor is arranged to determine said optical signal power, S, of said optical signal as $$S = \frac{X_i}{\frac{1}{k_i} + \frac{1}{osnr}\frac{B_i}{B_0}}.$$

11. The network element as claimed in claim 8, wherein said network element further comprises a memory device and said network element is further arranged to receive a power spectral density description comprising a plurality of k numbers for of a plurality of bandwidths, including said first bandwidth, $B_i$, and said second bandwidth, $B_j$, and to store said plurality of k numbers in said memory device, wherein said plurality of k numbers includes said first k number, $k_i$, and said second k number, $k_j$, and said processor is arranged to obtain said first k number, $k_i$, and said second k number, $k_j$, from said plurality of k numbers stored in said memory device.

12. The network element as claimed claim 11, wherein a filtering function is provided and stored within said memory device and said processor is further arranged to apply said filtering function to said power spectral density description to thereby modify said power spectral density description and to generate a power spectral density description signal indicative of said modified power spectral density description.

13. The network element as claimed in claim 8, wherein said network element further comprises a memory device and said network element is further arranged to:
   receive a total noiseless optical power of said optical signal and a power spectral density of said optical signal; and
   obtain said power spectral density description by,
      calculating said first k number, $k_i$, as the ratio of said total noiseless optical power of said optical signal to an optical power determined from said power spectral density of said optical signal across said first bandwidth, $B_i$, and
      calculating said second k number, $k_j$, as the ratio of said total noiseless optical power of said optical signal to an optical power determined from said power spectral density of said optical signal across said second bandwidth, $B_j$.

14. The network element as claimed claim 13, wherein a filtering function is provided and stored within said memory device and said processor is further arranged to apply said filtering function to said power spectral density to thereby modify said power spectral density and to generate a power spectral density signal containing said modified power spectral density.

15. The network element as claimed in claim 10, wherein said network element further comprises optical signal power control apparatus arranged to receive said further data signal and to control said optical power of said optical signal depending on said determined optical signal power, S.

16. The network element as claimed in claim 8, wherein:
said optical signal comprises a plurality of optical channels; and
each of said first bandwidth, $B_i$, and said second bandwidth, $B_j$, is not lower than a maximum resolution of said power monitoring unit and is not higher than a channel spacing of said plurality of optical channels.

17. The network element as claimed in claim 8, wherein said network element comprises a network node and said processor comprises a controller of said network node.

18. A non-transitory computer-readable storage medium that provides instructions that, if executed by a processor, will cause said processor to perform operations comprising:
receiving a first optical power, $X_i$, of an optical signal for a first bandwidth, $B_i$, across said optical signal;
receiving a second optical power, $X_j$, of said optical signal for a second bandwidth, $B_j$, across said optical signal;
obtaining a power spectral density description of said optical signal, wherein said power spectral density description comprises:
a first k number, $k_i$, dependent on a total noiseless optical power of said optical signal and an optical power determined from a power spectral density of said optical signal across said first bandwidth, $B_i$, and
a second k number, $k_j$, dependent on said total noiseless optical power and an optical power determined from said power spectral density across said second bandwidth, $B_j$;
receiving a reference bandwidth, $B_0$;
measuring said first optical power, $X_i$, of said optical signal across said first bandwidth, $B_i$;
measuring said second optical power, $X_j$, of said optical signal across said second bandwidth, $B_j$;
determining an optical signal to noise ratio, osnr, of said optical signal, said optical signal to noise ratio depending on said first optical power, $X_i$, said second optical power, $X_j$, and said power spectral density description, wherein said osnr is determined as $$osnr = \frac{\frac{B_j}{B_0}X_i - \frac{B_i}{B_0}X_j}{\frac{X_j}{k_i} - \frac{X_i}{k_j}}; \text{ and}$$

generating a data signal indicative of said optical signal to noise ratio.

19. The non-transitory computer-readable storage medium as claimed in claim 18, wherein the instructions, if executed by a processor, will further cause the processor to perform operations comprising determining an optical signal power, S, of said optical signal, said optical signal power depending on said first optical power, $X_i$, and said optical signal to noise ratio, and generating a further data signal indicative of said optical signal power.

20. The non-transitory computer-readable storage medium as claimed in claim 19, wherein said optical signal power, S, is determined as $$S = \frac{X_i}{\frac{1}{k_i} + \frac{1}{osnr}\frac{B_i}{B_0}}.$$

21. The non-transitory computer-readable storage medium as claimed in claim 18, wherein each of said optical powers is measured using a power monitoring unit and the instructions, if executed by a processor, will further cause the processor to perform operations comprising setting a resolution of said power monitoring unit to said first bandwidth, $B_i$, and measuring said first optical power, $X_i$, and setting said resolution of said power monitoring unit to said second bandwidth, $B_j$, and measuring said second optical power, $X_j$.

22. The non-transitory computer-readable storage medium as claimed in claim 18, wherein the instructions, if executed by a processor, will further cause the processor to perform operations comprising receiving a power spectral density description comprising a plurality of k numbers for a plurality of bandwidths, including said first bandwidth, $B_i$, and said second bandwidth, $B_j$, wherein said plurality of k numbers includes said first k number, $k_i$, and said second k number, $k_j$ and said first k number and said second k number are obtained from said plurality of k numbers.

23. The non-transitory computer-readable storage medium as claimed in claim 18, wherein the instructions, if executed by a processor, will further cause the processor to perform operations comprising:
receiving a total noiseless optical power of said optical signal and a power spectral density of said optical signal; and
obtaining said power spectral density description by,
calculating said first k number as the ratio of said total noiseless optical power of said optical signal to an optical power determined from said power spectral density of said optical signal across said first bandwidth, $B_i$, and
calculating said second k number as said total noiseless optical power of said optical signal to an optical power determined from said power spectral density of said optical signal across said second bandwidth, $B_j$.

24. The non-transitory computer-readable storage medium as claimed in claim 18, wherein:
each of said optical powers is measured using a power monitoring unit;
said optical signal comprises a plurality of optical channels; and
each of said first bandwidth, $B_i$, and said second bandwidth, $B_j$, is not lower than a maximum resolution of said power monitoring unit and is not higher than a channel spacing of said plurality of optical channels.

* * * * *